(12) United States Patent
Alacoque

(10) Patent No.: US 9,791,322 B2
(45) Date of Patent: Oct. 17, 2017

(54) MEASUREMENT CIRCUIT FOR BOLOMETRIC DETECTOR

(71) Applicant: Commissariat à l'Energie Atomique et aux Energies Alternatives, Paris (FR)

(72) Inventor: Laurent Alacoque, Voreppe (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/105,504

(22) PCT Filed: Dec. 1, 2014

(86) PCT No.: PCT/EP2014/076153
§ 371 (c)(1),
(2) Date: Jun. 16, 2016

(87) PCT Pub. No.: WO2015/090925
PCT Pub. Date: Jun. 25, 2015

(65) Prior Publication Data
US 2016/0320241 A1    Nov. 3, 2016

(30) Foreign Application Priority Data

Dec. 19, 2013  (FR) .................. 13 63037

(51) Int. Cl.
*G01J 5/02*     (2006.01)
*G01J 5/22*     (2006.01)
*H04N 5/33*    (2006.01)
*G01J 5/00*     (2006.01)
*G01J 5/20*     (2006.01)

(52) U.S. Cl.
CPC .............. *G01J 5/22* (2013.01); *H04N 5/33* (2013.01); *G01J 2005/0077* (2013.01); *G01J 2005/202* (2013.01)

(58) Field of Classification Search
CPC ........... G01J 5/20; H04N 5/3653; H04N 5/33
See application file for complete search history.

(56) References Cited

U.S. PATENT DOCUMENTS 5,756,999 A * 5/1998 Parrish ..................... G01J 5/20
                                                                    250/332
6,028,309 A * 2/2000 Parrish ..................... G01J 5/20
                                                                   250/252.1

(Continued)

FOREIGN PATENT DOCUMENTS

EP   22302341 A2   3/2011
WO  2010106286 A1  9/2010

OTHER PUBLICATIONS

Written Opinion of the International Searching Authority for International Application No. PCT/EP2014/076513, 9 pages.

(Continued)

*Primary Examiner* — Kiho Kim
(74) *Attorney, Agent, or Firm* — Moreno IP Law LLC

(57) ABSTRACT

A measurement circuit for a resistive sensor comprises an integrator of information representative of the difference between a current passing through the sensor and a first reference current, and a circuit for making the output of the integrator depend on a reference level.

14 Claims, 4 Drawing Sheets

(56) References Cited

U.S. PATENT DOCUMENTS

| | | | | |
|---|---|---|---|---|
| 7,071,471 B2* | 7/2006 | Robert | .................... | G01J 5/20 |
| | | | | 250/252.1 |
| 2003/0160171 A1* | 8/2003 | Parrish | .................... | G01J 5/22 |
| | | | | 250/338.1 |
| 2008/0055432 A1* | 3/2008 | Koseki | ................. | H04N 5/3658 |
| | | | | 348/241 |
| 2015/0207014 A1* | 7/2015 | Inoue | ................... | H01L 31/167 |
| | | | | 345/102 |

OTHER PUBLICATIONS

International Search Report for PCT/EP2014/076153, dated Mar. 6, 2015.

* cited by examiner

MEASUREMENT CIRCUIT FOR BOLOMETRIC DETECTOR

BACKGROUND

The present disclosure generally relates to electronic circuits and, more specifically, to a measurement circuit using a resistive sensor of bolometer type. The invention more specifically relates to the forming of an infrared imager.

DISCUSSION OF THE RELATED ART

A bolometer is a resistive element having a value which varies along with temperature. In a thermal imager, the respective resistances of different bolometers, generally arranged in an array where each bolometer represents a pixel, vary with an infrared flow originating from the targeted scene.

To use the value captured by a bolometer, a voltage is generally imposed to measure the current flowing through the resistive element.

FIG. 1 schematically shows a usual example of a measurement circuit 1 using a bolometer 2.

Bolometer 2 is exposed to the area where the infrared radiation is desired to be captured. The bolometer resistance varies according to the heating, and thus according to the received infrared radiation, but also, at the first order, to the temperature of the actual circuit, which is capable of varying with no relation with the targeted scene.

Bolometer 2 is series-connected with a reference element 3 formed of a bolometer of the same type as element 2, and having the function of isolating, from current Ibol flowing through bolometer 2, the portion which shows the useful radiation current. Reference element 3 is not sensitive to the infrared radiation of the scene to be measured. Typically, a bolometer shielded by a heat shield which masks resistive element 3 or a bolometer modified to have a very large thermal conductance and which is very strongly influenced by the circuit temperature (compensation bolometer) is used.

For the measurement to be possible, bolometers 2 and 3 should see, between their terminals, an identical fixed voltage. To achieve this, each bolometer is generally series-connected with a MOS transistor, respectively 8, 9, for example, with a P channel for bolometer 2 and an N channel for bolometer 3. Transistor 9 is connected between transistor 8 and bolometer 3 is grounded. Transistor 8, respectively 9, receives on its gate a bias voltage polP, respectively polN, corresponding, at the first order, to the voltage desired across the concerned bolometer to within a transistor threshold voltage. The bias signals are generated so that reference bolometer 3 sees between its terminals a voltage of same value as measurement bolometer 2 and conducts a current Iref.

Current Iu sampled from midpoint 4 of the series association of the bolometers (in the example shown in FIG. 1), between transistor 8 and transistor 9, is processed as a current representative of the infrared radiation received by bolometer 2. The above method is generally called base clipping, current Iu being a "base-clipped" current. Considering that bolometers 2 and 3 are strictly identical and that they are submitted to the local thermal environment, current Iu only depends on the heating due to the radiation received by the pixel.

An integrator, symbolized in the form of an operational amplifier 5 having an input 51, for example, an inverting input (−), connected to junction point 4 of elements 2 and 9 and having an input 52, for example, a non-inverting input (+), receiving a quiescent voltage Vref, is used. Output 53 of amplifier 5 is looped back onto its input 51 by a capacitive element C. A switch K1, controlled by a signal RST, defines the integration period by periodically resetting output voltage Vout to value Vref.

Output voltage Vout is digitally converted (analog-to-digital converter 6, ADC) at the rate of the integration periods, a switch K2 being interposed between the output of amplifier 5 and a capacitor 7 placed on the input of converter 6 and being turned on by a control signal CTRL at each end of an integration period to control the conversion.

FIG. 2 very schematically illustrates an embodiment of a bolometric imager. Such an imager is formed of an array of cells 10 organized in rows and in columns, each cell 10 incorporating a bolometric element 2. A plurality of bolometric elements 2 of a same column share a same measurement circuit 1 of the type illustrated in relation with FIG. 1. Selection circuits, not shown, enable to individually select the bolometers of a same column for a measurement by their common circuit.

A difficulty is due to the fact that the heating of measurement bolometer 2 results in a very small temperature difference from one pixel to the other of the imager structure, the bolometer resistance being essentially dependent on the circuit temperature. Accordingly, to be able to use the measurements, circuit 1 should be very sensitive. In particular, integrator 5 should have a high gain. A consequence is that it then becomes sensitive to the accuracy of the base clipping (compensation performed by reference element 3). Further, it is generally necessary to provide an element for regulating the circuit temperature due to the significant temperature variations capable of causing measurement errors.

Thus, the slightest technological dispersion between bolometers generates a significant different in the pixel responses.

Further, the desired accuracy causes a risk of saturation of the integrator in the occurrence of a base clipping error.

SUMMARY

An embodiment of the present description aims at a measurement circuit for a resistive sensor which overcomes all or part of the disadvantages of usual measurement circuits.

Another embodiment aims at providing a solution avoiding any risk of saturation of the integration cell in case of an inaccuracy of the base clipping current.

Another embodiment aims at providing a solution avoiding the use of an accurate analog-to-digital converter at the integrator output.

Thus, an embodiment provides a circuit comprising at least one resistive sensor, and at least one circuit for measuring a current Ibol flowing through a resistive sensor, comprising:

an integrator of information representative of the difference between a current flowing through the sensor and a first reference current during an integration period;

an analog-to-digital converter receiving the output of the integrator and outputting a digital output word over at least one bit, at the rate of a sampling control signal;

a digital-to-analog converter connected to the output of the analog-to-digital converter and delivering said first reference current, the value of the first reference current being a function of the value of the digital word present on the output of the analog-to-digital converter; the first reference current being capable of taking at least one first value smaller than current Ibol and at least one second value greater than current Ibol; and wherein the analog-to-digital converter delivers a series of a plurality of digital words at the sampling frequency, during the integration period, the series of digital words being representative of current Ibol.

An embodiment also provides an imager circuit, wherein the integrator delivers an output signal alternately increasing and decreasing according to whether the first reference current takes a first or a second value, the value of the output signal of the integrator oscillating around a reference level, said analog-to-digital converter and said digital-to-analog converter thus forming a circuit for controlling the output of the integrator with said reference level.

According to an embodiment, the analog-to-digital converter is a comparator of the output level of the integrator with a threshold and delivers a digital word over a single bit.

According to an embodiment, the analog-to-digital converter delivers a digital word over a plurality of bits.

According to an embodiment, the sampling control signal is a periodic signal having a sampling frequency greater than a reset frequency of the integrator.

According to an embodiment, the sampling frequency is at least 10 times greater than the reset frequency of the integrator.

According to an embodiment, said digital-to-analog converter receives information representative of a second reference current, and the first current delivered by the digital-to-analog converter varies according to this second reference current.

According to an embodiment, the first reference current is equal, according to the output state of the conversion element, to 1−1/n times or 1+1/n times the second reference current, n standing for an integer.

According to an embodiment, the second reference current is supplied by a shielded bolometer and/or the second reference current is supplied by a bolometer strongly thermally coupled with the circuit temperature.

According to an embodiment, the first reference current is equivalent to a quiescent current of fixed value during an integration period having a current which is variable during the integration period added thereto and/or subtracted therefrom and having its value at a given time depending on the digital word delivered by the analog-to-digital converter, and the quiescent current is adapted to each bolometer, the value of the quiescent current having been previously defined to take into account technological variations of the measurement sensors.

According to an embodiment, the circuit comprises a digital interpretation device, such as a microprocessor, connected to the output of the analog-to-digital converter, capable of delivering a digital value representative of current Ibol according to said series of digital words at the output of the analog-to-digital converter.

According to an embodiment, the measurement circuit further comprises a digital filter placed between the output of the analog-to-digital converter and said digital interpretation device.

According to an embodiment, the circuit is of thermal imager type, and the resistive sensors are bolometers arranged in an array, with a plurality of columns, the bolometers of a same column sharing a same measurement circuit, selection means enabling to select one of the bolometers in the column and to connect it to the circuit.

According to an embodiment, each column of bolometers is connected to a measurement circuit and the second reference current is common to a plurality of digital-to-analog converters of different measurement circuits.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
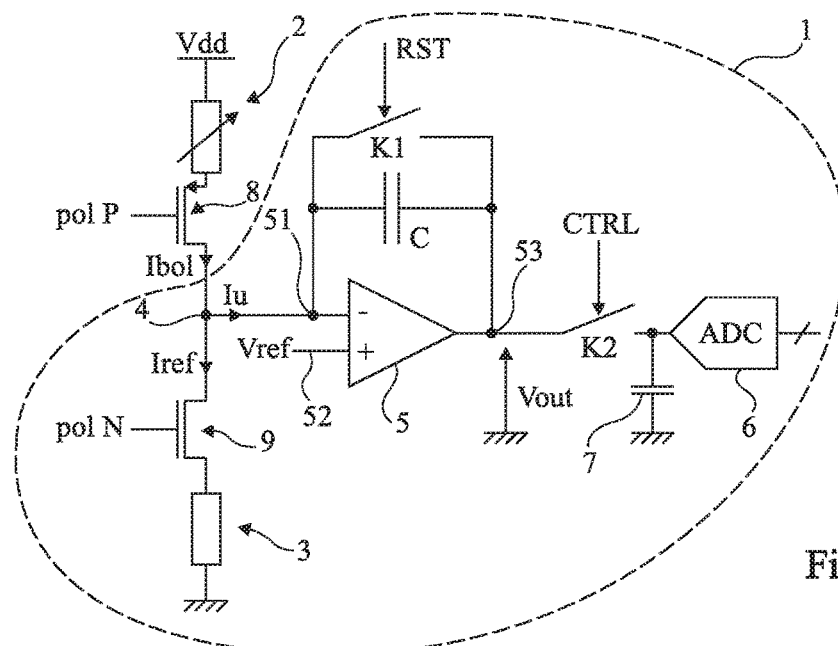
FIG. 1, previously described, very schematically shows a conventional example of a measurement circuit of a bolometric element.
Figure 2:
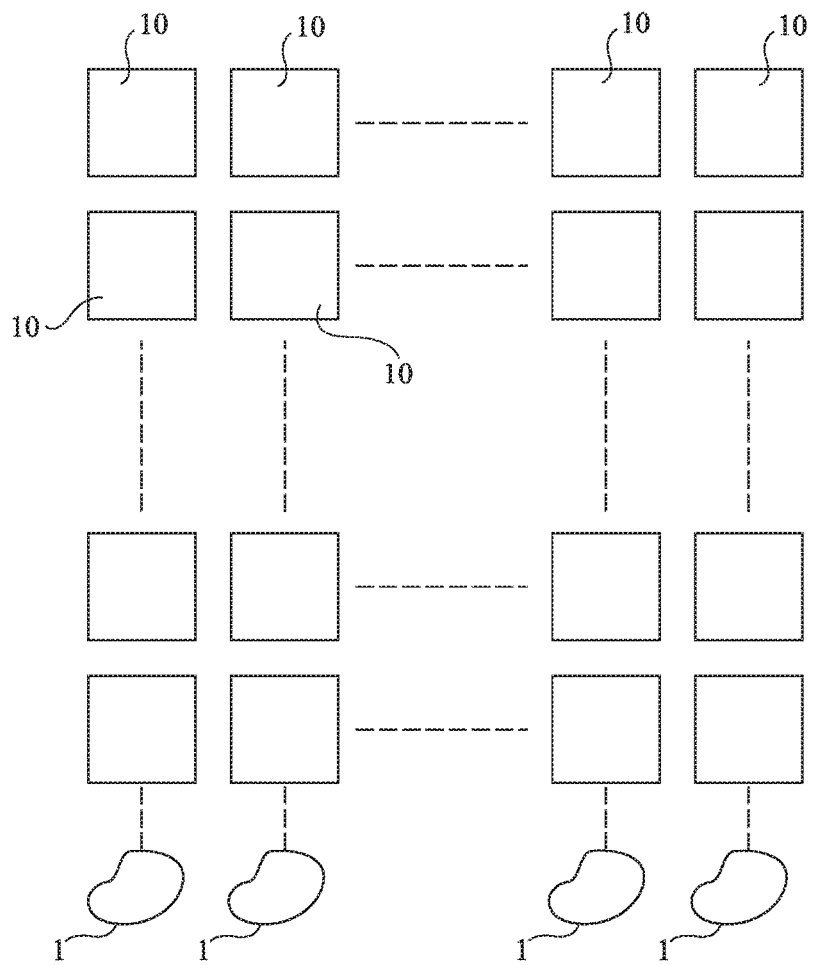
FIG. 2, previously described, illustrates an example of an array bolometric imager.

The same elements have been designated with the same reference numerals in the different drawings. For clarity, only those elements which are useful to the understanding of the embodiments which will be described have been shown and will be detailed. In particular, the processing of the measurements perform to restore images has not been detailed, the described embodiments being compatible with the usual processing of measurements provided by bolometric imagers. Further, when reference is made to expressions "approximately", "in the order of", or "around", this means to within 10%, and when an identity is mentioned, this means to within technological dispersions.

Figure 3:
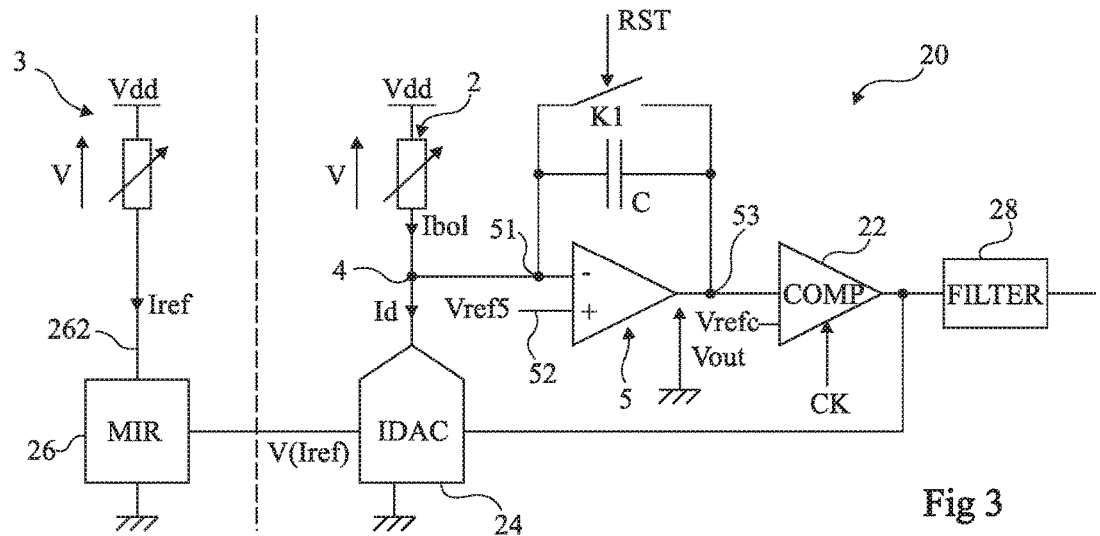
FIG. 3 shows an embodiment of a measurement circuit for a thermoresistive element of bolometer type.

FIG. 3 schematically shows an embodiment of a circuit 20 for measuring the resistance of a thermistor of bolometer type. It shows a measurement element 2 formed of a bolometer having a controlled voltage V between its terminals. For simplification, only a voltage V across bolometer 2 is shown, the example of a transistor series-connected with the bolometer such as described in FIG. 1 being also applicable in the present case. Voltage V is typically in the range from 1 to 2 volts. The drawing also shows an integrator assembly based on an operational amplifier 5 having its output and inverting input terminals 53 and 51 (−) interconnected by a capacitive element C capable of being shorted by means of a switch K1 controlled by a signal RST defining the integration periods and having its non-inverting input terminal (+) receiving a DC reference potential Vref5.

According to this embodiment, a current source 24, sampling a base clipping current Id, is connected to input 51 of amplifier 5 (junction point 4 of bolometer 2 and of the base clipping current source) and the value of the base clipping current is controlled by the variation of output voltage Vout of the integrator assembly.

More specifically, according to the embodiment of FIG. 3, output terminal 53 of amplifier 5 is connected to a first input of a comparator 22 (COMP) having a second input receiving a reference potential Vrefc, preferably identical to potential Vref5. Comparator 22 is controlled by a periodic activation signal CK, of frequency higher than the integration frequency defined by signal RST. More generally, the output of integrator 5 is processed by an analog-to-digital conversion element over one or a plurality of bits.

The output of this element (here, comparator 22) is provided at the input of a circuit 24 for generating base clipping current Id, controlled by the value of output voltage Vout. The quiescent level of the base clipping current generation circuit is for example supplied by a source of a current of value Iref. The quiescent level is for example the base clipping current delivered when signal RST is activated and when the output of comparator 22 is then equal to one of the two possible values, preferably value 0. Circuit 24 forms a digital-to-analog converter processing the digital signal supplied by element 22 to generate the base clipping current.

In the embodiment illustrated in FIG. 3, current Iref is extracted from a reference bolometer 3, for example, shielded or strongly thermally coupled to the circuit temperature, that is, sensitive to the circuit temperature only. Bolometer 3 is connected to converter 24 via a current mirror assembly 26 (MIR). In the same way as for bolometer 2, the bolometer is symbolized by a variable resistor having, between its terminals, an approximately fixed voltage V.

Figure 4:
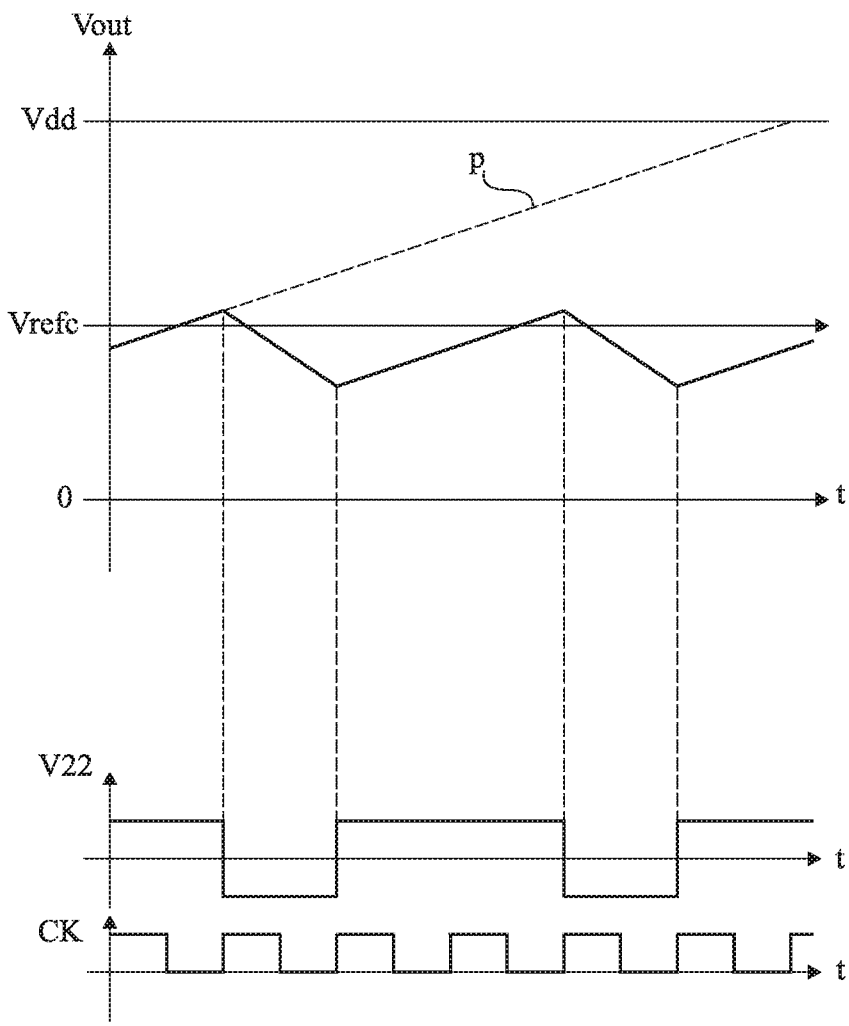
FIG. 4 illustrates in timing diagrams the operation of the circuit of FIG. 3.

FIG. 4 illustrates, in the form of timing diagrams, the operation of the assembly of FIG. 3. A first timing diagram shows an example of values of voltage Vout output by integrator 5, for a given value of reference current Iref. A steady state is thus considered, that is, value Iref is assumed to be stable (the temperature is assumed not to vary) in the shown time range. In practice, value Iref is likely to vary. A second timing diagram provides an example of level V22 output from comparator 22. A third timing diagram illustrates the shape of periodic signal CK for triggering comparator 22.

In this example, a triggering of the comparison on the rising edge of clock signal CK is assumed. The period of signal CK is shorter than the period of signal RST setting the integration durations, typically by a ratio from 128 to 512, preferably representing a power of 2 to simplify the digital processing. It should be noted that with a ratio in the order of 16 (selected since it is a multiple of two), advantageous results can already be obtained. A ratio at least equal to 10 and if possible greater than 100 will thus be selected to have a very good measurement accuracy.

A decrease in the resistance of bolometer 2 resulting, on the output voltage side, in an increase in voltage Vout, is assumed. In the absence of the feedback device, this voltage would increase (dotted lines p) until it reaches power supply voltage Vdd, whereby the integrator saturates. Due to comparator 22 and to the feedback on converter 24, voltage Vout oscillates around level Vrefc. This translates, on the output voltage of comparator 22, as a digital signal which should be interpreted as a bit train delivering, on the integration period set by signal RST, a digital value representative of the resistance of the bolometer and thus of the performed measurement.

As shown in FIG. 4, voltage Vout is alternately increasing and decreasing. The slope is increasing as long as the comparator output is positive, and conversely. The slope is positive if the current in bolometer 2 Ibol is greater than base clipping current Id, and conversely. It can thus be seen that current Id is alternately greater and smaller than current Ibol and that its value is reset, that is, kept or modified, for each sampling of voltage Vout by comparator 22. Voltage Vout varying with a positive slope and a negative slope which are identically repeated from one halfwave to the other, it can be deduced that the base clipping current Id+ associated with a negative slope and the base clipping current Id− associated with a positive slope are always the same in the present example.

It should be noted that values Id− and Id+ should be selected to be respectively smaller and greater than current Ibol. Due to the fact that Ibol is not known, since it is desired to be measured, it is thus necessary for Id− and Id+ to be respectively lower and higher than the range of current Ibol which is desired to be measured.

In the example of FIG. 3, the output of comparator 22 provides the result of the measurement carried out by the bolometer in the form of a bit train at the frequency of signal CK. The signal is processed by a digital filter 28 (FILTER) to supply the rest of the application with the value of the infrared illumination received by the pixel. The digital filtering is of low-pass type and for example takes the form of a counter or of an integrator. The integrator or the counter is then reset with the same periodicity as the integration period (signal RST for controlling switch K1).

As a variation, output 53 of amplifier 5 is processed by a circuit (switch K2 and converter 6) of the type described in relation with FIG. 1, for example to refine the digital estimate resulting from the digital filtering of the comparator output.

Figure 5:
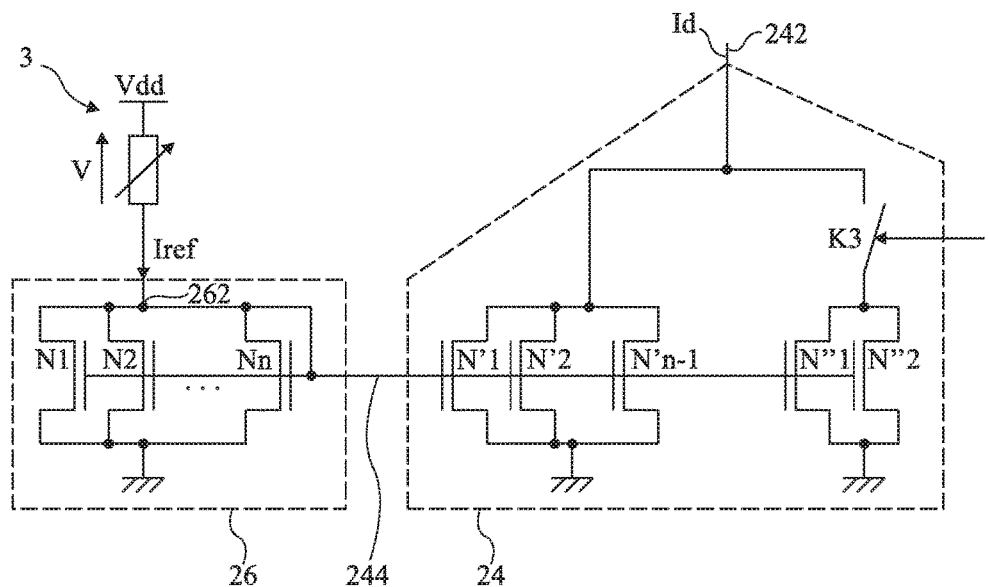
FIG. 5 shows an embodiment of a detail of FIG. 3.

FIG. 5 shows an embodiment of circuit 24, associated with an embodiment of circuit 26. According to this example, n MOS transistors N1, N2, Nn in parallel between terminal 262 of application of current Iref originating from element 3 and the ground are used, the gates of these transistors being inter-connected and connected to ground 262 (diode-assembled transistors). Terminal 262 is connected to a terminal 244 supplying circuit 24 with a voltage V(Iref). Terminal 244 is connected to the gates of two assemblies of transistors of converter 24 to form, with circuit 26, the current mirror. A first assembly comprises n−1 transistors N' connected in parallel having their gates interconnected to node 244, having their sources connected to ground, and having their drains interconnected to analog output terminal 242 of converter 24. A second sub-assembly comprises two transistors N"1 and N"2 connected in parallel between a switch K3 and the ground and having their gates interconnected to node 244, switch K3 connecting the second assembly to terminal 242 (as a variation, switch K3 is on the ground side).

By using transistors N, N', and N" of identical size, the current flowing through each of transistors N and N' is Iref/n and the assembly of transistors N' conducts a current (n 1/n)Iref. When switch K3 is on, each of transistors N" also conducts a current Iref/n and a current 2Iref/n flows through all transistors N". Thus, the current Id drawn by converter 24 on node 4 (controlled base clipping current) takes a value (1−1/n)Iref when switch K3 is off and a value (1+1/n)Iref when switch K3 is on. It can be seen that according to the result output from comparator 22, the base clipping current of bolometer 2 will be modified around value Iref, which provides the desired control. It should be noted that value Iref varies according to the operating temperature of the circuit.

Figure 6:
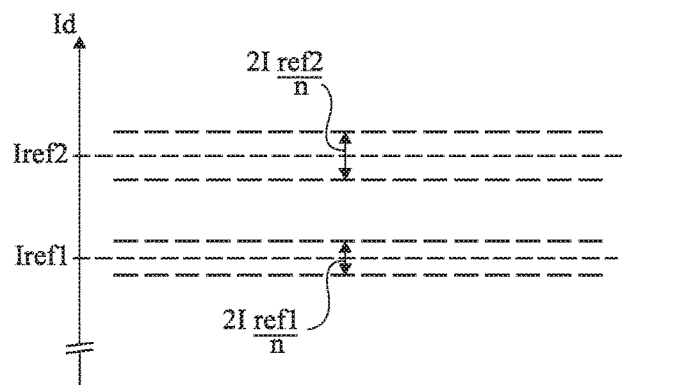
FIG. 6 illustrates the operation of the circuit of FIG. 5.

FIG. 6 illustrates the operation of the circuit of FIG. 5. This drawing shows two examples of possible variation ranges of current Id for two values Iref1 and Iref2 taken by current Iref. Variation ranges 2Iref1/n and 2Iref2/n around respective values Iref1 and Iref2 show the ranges in which current Ibol will vary in these two examples.

It should be understood from FIG. 6 that it is important for the values of base clipping current Id− and Id+ supplied by converter 24 to vary according to the circuit temperature. In this example, Id− and Id+ are respectively equal to (n−1)*Iref/n and (n+1)*Iref/n, and vary in the same way as current Iref. Since current Iref originates in the present example from a reference bolometer, the variations of currents Id− and Id+ thus follow the same variations as those of the current supplied by bolometer Ibol. It is thus ensured that values Id− and Id+ are always respectively lower and higher than the possible variation range of current Ibol.

The selection of number n depends on the desired accuracy and excursion around reference current value Iref. The larger the value of n, the better the accuracy (of the analog-to-digital conversion) but the less robust the circuit to the base clipping inaccuracy. The smaller the value of n, the larger the excursion around value Iref, and thus the more robust the circuit to the base clipping inaccuracy, but the lower the measurement accuracy. A tradeoff between accuracy and excursion is thus performed. As a specific embodiment, number n is in the range from 2 to 256, preferably from 8 to 128.

According to an alternative embodiment, transistors of different sizes or a different number of transistors N"2 (for example, a single transistor or a number of transistors N" greater than 2) may be used. According to another variation, a current source other than a bolometer may be used to supply current Iref. It should be noted that it is preferable for the supplied reference current Iref to vary according to temperature, to follow the corresponding current fluctuations of any bolometer and ensure that the measurement remains possible and correct. This will enable to avoid adding means for regulating the circuit temperature, such means being often complex and expensive.

Figure 7:
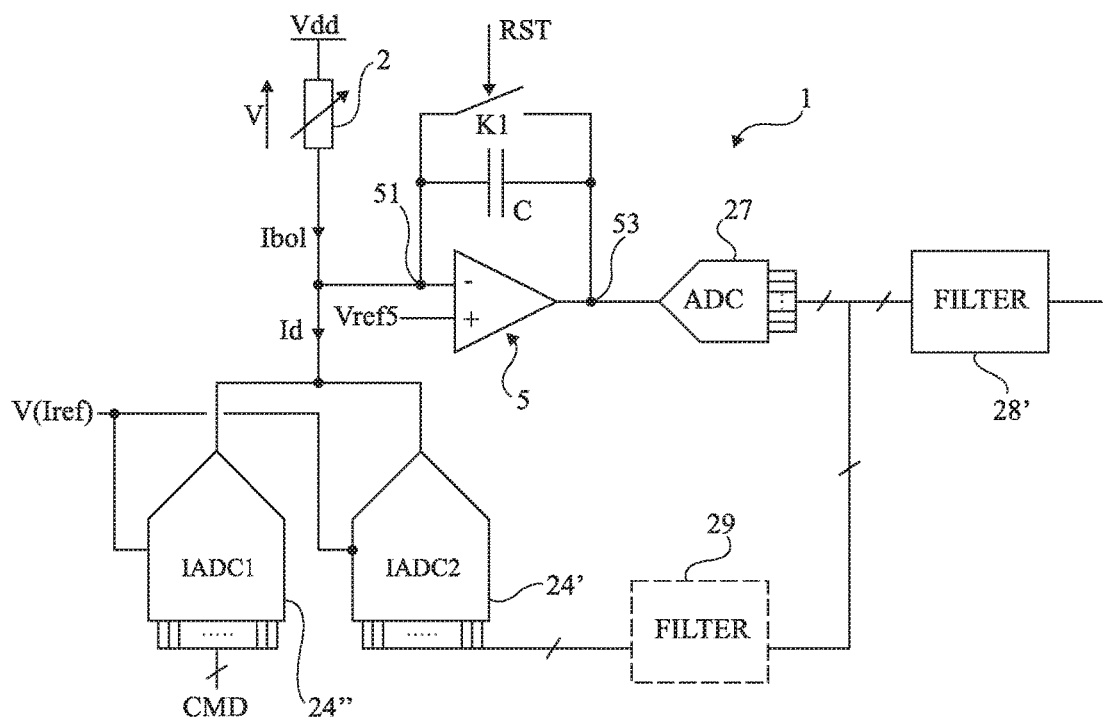
FIG. 7 shows another embodiment of a detail of FIG. 3.

FIG. 7 shows another embodiment of circuit 24. According to this example, voltage V(Iref) supplied by current mirror 26 of FIG. 3 is used as a reference for two digital-to-analog base clipping current generation converters 24' and 24" (IDAC2 and IDAC1). A first converter 24' receives a digital word to be converted from an analog-to-digital converter 27 (ADC) replacing comparator 22 of FIG. 3. Converter 27 samples the signal at a frequency greater than the reset frequency (RST) of integrator 5. A second converter 24" receives a fixed (static) digital reference word CMD and is used to generate a quiescent current having the variation generated by converter 24' added thereto. In the example of FIG. 7, a digital filter 28' (FILTER) performs a filtering function similar to that of converter 28 of FIG. 3 but from a word of a plurality of bits received in parallel. An additional digital filter 29 (FILTER, in dotted lines in FIG. 7) may be interposed between converters 27 and 24'. This embodiment enables to increase the ability to adjust the variation slopes of signal Vout, which increases the number of switchings around value Vref5 at the output of amplifier 5, and thus the accuracy.

A same analog-to-digital converter may be used either in open loop as in FIG. 1 (converter 6) or in the regulation loop (converter 27). Measurement circuit 1 then has two operating modes.

An advantage of the described embodiments is that it is now possible to do away with problems of saturation of the measurement circuits of bolometers. Further, since the voltage excursion at the integrator output is decreased as compared with known devices, it is in practice possible to operate the circuit with lower voltages. As a variation or complementarily, it is possible to decrease the size of the capacitance of capacitor C of the integrator. The capacitance decrease further enables to increase the integrator gain (slope of output signal Vout) and accordingly to increase the measurement accuracy by increasing the switching frequency of the output of the analog-to-digital converter.

Although a reference bolometer may be assigned to each pixel, the reference bolometer may now easily be shared between a plurality of circuits 20 in an array arrangement, or even for the entire array. In this last case, the surface area occupied by the general imager is considerably decreased.

According to another variation, a plurality of reference bolometers may be used (preferably shared by a plurality of circuits 20) and averaged to further increase the accuracy.

Another advantage is that the described circuit is compatible with circuits currently used downstream of the measurement circuits and in particular with any processing performed on the digital side on the interpretation of the measurements. Indeed, the bit train output from the comparator in the example shown in FIG. 3 or the series of digital words delivered by the analog-to-digital converter of the example shown in FIG. 7 can easily be interpreted by current digital processing circuits, such as a digital integrator, a digital low-pass filter or their equivalent functions carried out in the form of a program in a microprocessor or digital processing circuit. In the almost indispensable case where a filter 28, 28' is placed at the analog-to-digital conversion output, the digital processing is of course performed after the filter.

Further, in each of the shown examples, the analog-to-digital converter is very simple, such as the comparator, or relatively simple (ADC over 2 bits, for example) as compared with the system of the state of the art for which the analog-to-digital converter should be relatively large, over 12, 14 bits to provide a sufficient measurement accuracy. Comparatively, a digital filter has a relatively low bulk and a much lower power consumption. A circuit according to the invention further consumes much less power than a conventional circuit (no more need for an ADC), the power consumption being typically decreased by a factor 5.

It should further be noted that in each of the described examples, base clipping current Id is actually formed of a fixed current or quiescent current Ir, of constant value during an integration period, and of a variable current Iv. In the example of FIG. 5 and of FIG. 7, quiescent current Ir corresponds to minimum base clipping current Id− and a variable current Iv, positive or zero, is added to quiescent current Ir. However, it will be within the abilities of those skilled in the art to devise an alternative embodiment where the quiescent current would for example be an intermediate value in the range of possible values for current Ibol (for a given temperature) and variable current Iv would add or be subtracted from quiescent current Ir (by for example providing complementary transistors respectively connected to ground or to the power supply voltage).

Further, the present invention may easily be combined with the invention described in the applicant's other patent application, having publication number WO 2010/106286 A1. The invention aims at suppressing measurement errors due to the technological dispersion of bolometers. Indeed, for a same heat flow (or in other words, a same infrared light flow, for example), bolometers may have different currents Ibol according to their technological parameters. This other invention thus provides adding additional current generators 205, 206, 207 to the measurement circuit to add or subtract an adaptation current Ia to the general base clipping current Ib supplied by a shielded bolometer. Each additional current generator is selectable and the selection is a function of a digital configuration value predefined for each bolometer. The digital configuration values are defined during a calibration phase during which a plurality of measurements of a same image are performed and the proper selection of the additional current generators is searched by successive approximations. During each test, with a given selection of current generators, a conventional reading is performed by letting the integrator integrate for a predefined integration period and the value of the integrator output is compared, after each integration, with a reference value. As the tests are being carried out, the circuit converges towards an optimal configuration of the additional current generators enabling to have a lesser difference between a reference voltage Vref and output voltage Vs of the integrator at the end of an integration phase. The optimal configuration obtained for the bolometer which is being calibrated is stored, after which the same procedure is applied for the other bolometers. Once the calibration is over, the stored configuration values will be applied during the imager use, to form images. Thus, when a reading from a selected bolometer is performed by the measurement circuit, the additional current generators are activated or not according to the configuration stored for the selected bolometer. A same configuration of selection of the additional current generators is applied during the entire integration time and the integrator output voltage will monotonously vary (either increase, or decrease) according to the difference between bolometer current Ibol and the "adapted" base clipping current corresponding to Ib (general base clipping)+Ia (adaptive base clipping associated with the selected bolometer). The integrator output voltage at the end of the integration period is then conventionally representative of the current flowing through the selected bolometer.

The association of the two ideas then comprises adapting, for each bolometer, quiescent current Ir (fixed portion of base clipping current Id) to take into account the technological dispersion of the selected bolometer. In other words, quiescent current Ir may be formed of a general quiescent current Ir-general identical for all bolometers and of a quiescent current Ir-specific adapted to each bolometer and predefined according to a previous calibration procedure, such as that explained in the above-mentioned document. As previously indicated, current Ir (equal to Ir-general+Ir-specific) adds to variable current Iv (taking part in the "delta-sigma" reading) to provide current Id, delivered by the digital-to-analog converter.

A practical embodiment of such a combination of ideas for example comprises adding to the digital-to-analog converter of FIG. 5 NMOS-type transistors M1, M2 to Mk connected by their gate to node 244 and each associated, by their drain, with a selection switch further connected to node 242 and which will be made conductive or not according to the configuration value stored for the selected bolometer. The number and the size of transistors N' intended to supply current Ir-general and the number and the size of transistors M intended to supply current Ir-specific will be adapted so that the minimum and maximum values of current Id (equal to Ir-general+Ir-specific +Iv) are respectively lower and higher than the range of possible current for a bolometer.

Further, as can be noticed by those skilled in the art, the described circuits comprise all the elements of a delta-sigma converter (apart from the post-filter digital processing, which is not shown). The measurement is thus carried out due to a delta-sigma "loop" receiving an input signal (Ibol-Id-fixed portion) having a feedback current (Id-variable portion) added/subtracted thereto/therefrom, the result thereof being integrated by integrator 24/24', converted by analog-to-digital converter 22/27, the feedback being performed by digital-to-analog converter 24/24'. It should be noted that the frequency of signal CK, called sampling frequency hereabove, actually corresponds to the "oversampling" frequency, using the current vocabulary of delta-sigma converters; the reset frequency of signal RST (which enables to set the integration periods) would then correspond to the sampling frequency.

Another advantage is that the implementation does not require modifying the control signals defining the integration period. Only the clock signal of analog-to-digital conversion element 22 or 27 should be provided.

Another advantage is that it is now possible to do away with a circuit temperature regulation element, which is a considerable saving.

Various embodiments have been described. Various alterations, modifications, and improvements will readily occur to those skilled in the art. In particular, the practical implementation of the described embodiments is within the abilities of those skilled in the art based on the functional indications given hereabove and by using design techniques usual per se.

What is claimed is:

1. A circuit comprising at least one resistive sensor and at least one circuit for measuring a current Ibol flowing through a resistive sensor, comprising:
    an integrator of information representative of the difference between a current flowing through the sensor and a first reference current during an integration period;
    an analog-to-digital converter receiving the output of the integrator and outputting a digital output word over at least one bit, at the rate of a sampling control signal;
    a digital-to-analog converter connected to the output of the analog-to-digital converter and delivering said first reference current, the value of the first reference current being a function of the value of the digital word present on the output of the analog-to-digital converter; the first reference current being capable of taking at least one first value smaller than current Ibol and at least one second value greater than current Ibol; and
    wherein the analog-to-digital converter delivers a series of a plurality of digital words at the sampling frequency, during the integration period, the series of digital words being representative of current Ibol.

2. The imager circuit of claim 1, wherein the integrator delivers an output signal alternately increasing and decreasing according to whether the first reference current takes a first or a second value, the value of the output signal of the integrator oscillating around a reference level, said analog-to-digital converter and said digital-to-analog converter thus forming a circuit for controlling the output of the integrator with said reference level.

3. The circuit of claim 1, wherein the analog-to-digital converter is a comparator of the output level of the integrator with a threshold and delivers a digital word over a single bit.

4. The circuit of claim 3, wherein the sampling control signal is a periodic signal having a sampling frequency greater than a reset frequency of the integrator.

5. The circuit of claim 4, wherein the sampling frequency is at least 10 times greater than the reset frequency of the integrator.

6. The circuit of claim 3, wherein said digital-to-analog converter receives information representative of a second reference current, and wherein the first current delivered by the digital-to-analog converter varies according to this second reference current.

7. The circuit of claim 6, wherein the first reference current is equal, according to the output state of the conversion element, to $1-1/n$ times or $1+1/n$ times the second reference current, n standing for an integer.

8. The circuit of claim 6, wherein the second reference current is supplied by a shielded bolometer and/or wherein the second reference current is supplied by a bolometer strongly thermally coupled with the circuit temperature.

9. The circuit of claim 1, wherein the analog-to-digital converter delivers a digital word over a plurality of bits.

10. The circuit of claim 1, wherein the first reference current is equivalent to a quiescent current of fixed value during an integration period having a current which is variable during the integration period added thereto and/or subtracted therefrom and having its value at a given time depending on the digital word delivered by the analog-to-digital converter, and wherein the quiescent current is adapted to each bolometer, the quiescent current value having been previously defined to take into account technological variations of the measurement sensors.

11. The circuit of claim 1, comprising a digital interpretation device, such as a micro-processor, connected to the output of the analog-to-digital converter, capable of delivering a digital value representative of current Ibol according to said series of digital words at the output of the analog-to-digital converter.

12. The circuit of claim 11, wherein the measurement circuit further comprises a digital filter placed between the output of the analog-to-digital converter and said digital interpretation device.

13. The circuit of claim 1, of thermal imager type, wherein the resistive sensors are bolometers arranged in an array, with a plurality of columns, the bolometers of a same column sharing a same measurement circuit, selection means enabling to select one of the bolometers in the column and to connect it to the circuit.

14. The thermal imager circuit of claim 13, wherein said digital-to-analog converter receives information representative of a second reference current, wherein the first current delivered by the digital-to-analog converter varies according to this second reference current, wherein each bolometer column is connected to a measurement circuit and wherein the second reference current is common to a plurality of digital-to-analog converters of different measurement circuits.

* * * * *